Patented Aug. 14, 1923.

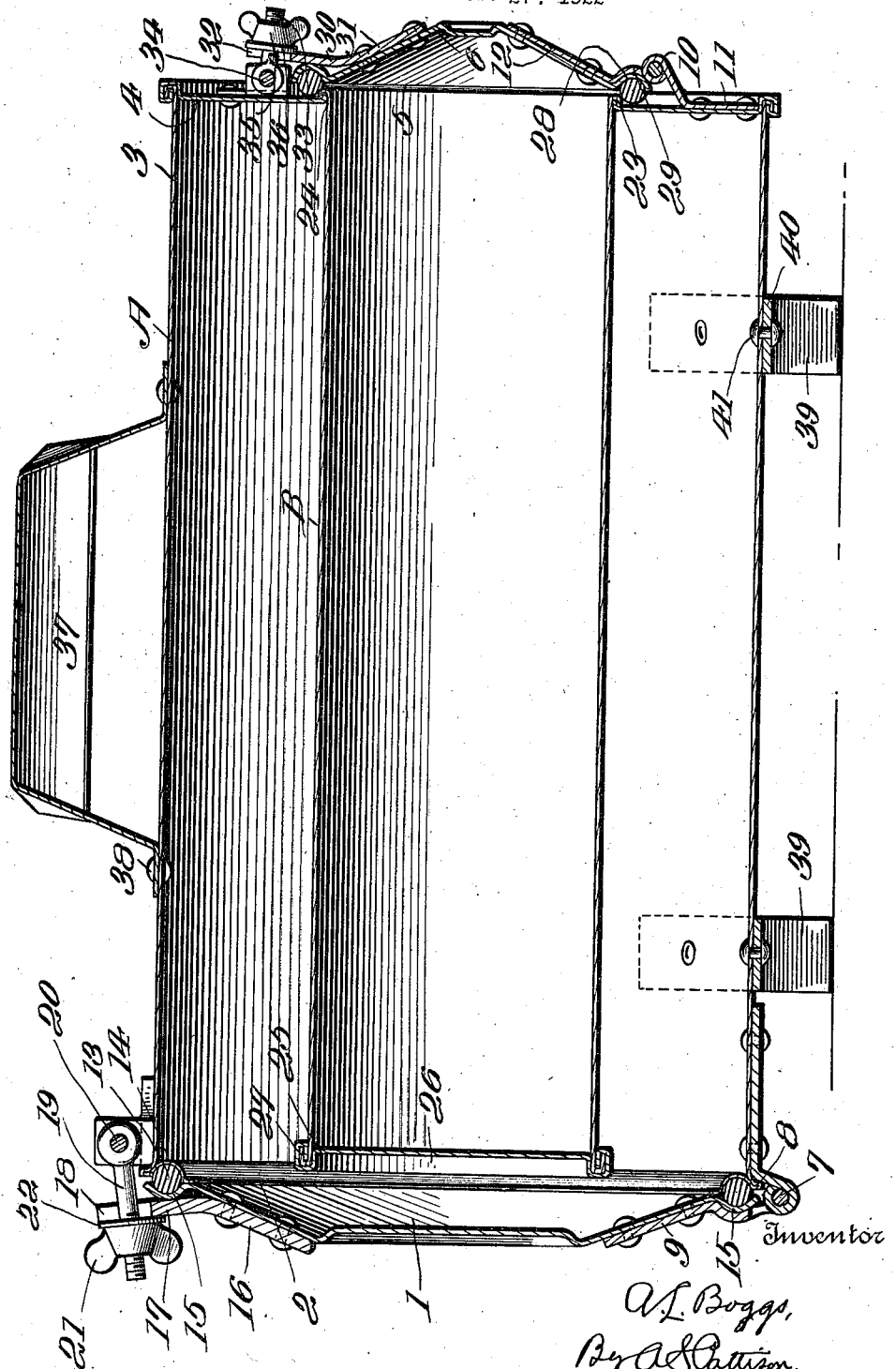

1,465,110

UNITED STATES PATENT OFFICE.

ATWOOD L. BOGGS, OF BROOKLINE, MASSACHUSETTS.

FISH COOLER AND CARRIER.

Application filed February 27, 1922. Serial No. 539,541.

*To all whom it may concern:*

Be it known that I, ATWOOD L. BOGGS, a citizen of the United States, residing at Brookline, in the county of Norfolk and State of Massachusetts, have invented certain new and useful Improvements in Fish Coolers and Carriers, of which the following is a specification, reference being had therein to the accompanying drawing.

This invention relates to improvements in a fish cooler and carrier.

The object of this invention is to provide a combined portable fish cooler and carrier, wherein separate compartments are provided for the cooling element and for the fish.

Another object of my invention is to provide a combined portable fish cooler and carrier which is highly sanitary.

Another object of my invention is to provide a combined portable fish cooler and carrier of a convenient size for transportation, simple and cheap of manufacture, very useful and efficient.

A further object of my invention is to provide a combined portable fish cooler and carrier incorporating certain novel features of construction, which will be hereinafter more fully set forth in the accompanying drawing and following description.

The drawing—

Is a vertical longitudinal sectional view of my improved fish cooler and carrier.

Referring now to the drawing, in which like parts are designated by similar reference numerals throughout the description, A is the outer cylindrical receptacle used for carrying a cooling element, which is preferably ice, and B is an inner receptacle adapted to receive and carry the fish. Although I have designated and named my device as a fish cooler and carrier, it will be readily understood that my dvice can be used for transporting other things than fish, without departing from the spirit of my invention. In fact, to persons occupied in some particular trade or pursuit, my device might readily be found to be highly useful for cooling during transportation articles or things other than fish.

In the form of my invention as shown in the drawing, the cylindrical container A is hollow, being provided at one end with a door 1, which is of a size to completely close the entire open end 2 thereof, while its opposite end 3 is provided with an end-wall 4, having therein a central opening 5, which is closed by a door 6.

The door 1 which closes the open end 2 of the container A, is pivotally mounted on a hinge 7, which is fastened as at 8 to the container, and as at 9 to the door in any suitable manner, such as shown.

The door 6, which closes the opening 5 of the end 3 of the container A, is likewise pivotally mounted on a hinge 10, which is suitably fastened as at 11 to the container end 4, and as at 12 to the door.

To provide a water-tight closure for the open end 2 of the container A, I have provided a gasket 13, preferably constructed of rubber, which is carried in the inwardly crimped circumferential groove 14, in the end 2 of the container A. The door 1 is provided with a circumferential bead 15, to receive the outwardly extending portion of the rubber gasket 14, which is preferably made round in cross-section, as clearly appears in the drawing.

Suitably mounted, as at 16, at the top of the door 1, is a hasp member 17, having a forked end 18, while the end 2 of the container A carries a bolt-member 19 pivotally mounted as at 20 and provided with a thumb-nut 21 and washer 22.

It will readily appear that upon closing the door that the bolt 19 can be dropped upon the forked end of the hasp-member 17, and by means of the thumb-nut 21, the door 1 can be clamped tightly upon the gasket 13, thereby making a water-tight joint.

The container B, which is adapted to receive and carry the fish, or other such articles as desired, is cylindrical in its preferable form and is supported from the end wall 4 of the container A, in any suitable manner, such as crimping its ends 23 over the inner peripheral edge of the end wall 4, as clearly appears in the drawing. The outer end 24 of the container B is open, while the inner end 25 of the container is closed by an end cap 26, which is crimped upon the end 25 of the container B, as at 27, or fastened in place in any other simple and convenient manner.

In order that the door 6 may constitute a water-tight closure, with the open end 24 of the container B, this door is provided with a circumferential bead 28, in which is carried a gasket 29, preferably constructed of rubber and round in cross-section.

In like manner to the door 1, this door is provided with a hasp-member 30, which is suitably fastened to the door, as at 31, and is provided with a forked end 32, into which extends a pivotally mounted bolt 33, suitably pivoted to the end-wall 4 of the container A, as at 34, and being provided with a thumb-screw 35 and washer 36.

It will be readily seen that through the medium of the hasp and bolt, that the door 6 can be clamped tightly around the open end 24 of the container B, and upon the end 4 of the container A and thereby constitute a water-tight closure for the open end of the container B.

For convenience in transportation, I have provided a handle 37, for my device, which is suitably fastened as at 38 to the outer container A. In addition I have also provided the device with legs 39, which are in the form of a cradle, inasmuch as the legs at the opposite sides of the device are joined by a band 40 running beneath the large outer container A, and being fastened there in any suitable manner, such as at 41.

I desire to call attention to the fact that although I have shown my device in a cylindrical form, I do not limit myself to this shape, as the device could be made with square sides without departing from the spirit of my invention.

I desire it also to be noted that the entrance to the cooling compartment of my device is at the opposite end to the entrance of the carrying compartment, and that the two compartments are both water and air tight, one from the other. From this it will be seen that the cooling element carried by the larger container A, does not come in direct contact with the contents of the carrying compartment B. I also desire to note, at this point, that although I have described a larger outer container A, as being the container to carry the cooling element, that this form need not necessarily be followed, as the inner container B could be used to carry the cooling element if it be desired, having the larger container A for taking care of the articles to be carried and cooled.

Having thus described my invention what I desire to protect and claim by Letters Patent is:

1. A fish cooler and carrier, comprising inner and outer containers, the outer container having one end open with the exception of a circumferential groove, the opposite end of the outer container being provided with an end wall having an opening, the inner container supported within the outer container by the edges of said end wall opening, and means to close the opposite open ends of the two containers.

2. A device of the character described, comprising inner and outer containers having opposite open ends, doors to close the container ends, and pivoted clamping means carried by the outer container to clamp the doors closed, for the purpose described.

3. A device of the character described, comprising inner and outer containers having their opposite ends open, doors for the open container ends, the doors provided with circumferential beads adapted to receive a packing, the outer edge of the container openings adapted to receive and carry a packing, and pivoted clamping means carried by the outer container to clamp the doors closed, for the purpose described.

In testimony whereof I hereunto affix my signature.

ATWOOD L. BOGGS.